(12) United States Patent
Bell et al.

(10) Patent No.: US 6,752,235 B1
(45) Date of Patent: Jun. 22, 2004

(54) SUBFRAME DRIVELINE MODULE

(75) Inventors: Dale K. Bell, Ortonville, MI (US); Jay Sandler, Rochester, MI (US)

(73) Assignee: Meritor Heavy Vehicle Systems LLC, Troy, MI (US)

( * ) Notice: Subject to any disclaimer, the term of this patent is extended or adjusted under 35 U.S.C. 154(b) by 0 days.

(21) Appl. No.: 09/469,072

(22) Filed: Feb. 14, 2000

(51) Int. Cl.[7] ........................ B60K 17/16; B60K 17/36; B60G 3/20
(52) U.S. Cl. ................. 180/360; 180/24.04; 180/24.11; 180/378; 280/124.109; 280/124.135; 280/124.156
(58) Field of Search ........................... 180/24.04, 24.09, 180/24.11, 24.12, 359, 360, 375, 378, 312; 280/124.19, 124.156, 788, 124.135

(56) References Cited

U.S. PATENT DOCUMENTS

| | | | | |
|---|---|---|---|---|
| 1,942,644 A | * | 1/1934 | Holman | 180/24.04 |
| 2,278,303 A | * | 3/1942 | Blaser | 280/124.156 |
| 3,022,847 A | * | 2/1962 | Hansen et al. | 180/360 |
| 4,848,789 A | * | 7/1989 | Timoney et al. | 280/124.138 |
| 5,820,150 A | * | 10/1998 | Archer et al. | 280/124.136 |

FOREIGN PATENT DOCUMENTS

WO      WO 9922979 A1  *  5/1999     ........... B62D/21/11

* cited by examiner

Primary Examiner—Peter C. English
(74) Attorney, Agent, or Firm—Carlson, Gaskey & Olds

(57) ABSTRACT

A driveline assembly module includes a drivetrain assembly that is a rigid, substantially box-like member, that is the main support structure for all the driveline components. An independent suspension system having an associated wheel hub is also attached to the drivetrain assembly. By mounting the driveline components and independent suspension as an integral module, the components are replaced or serviced by replacement of the entire module. Thus, the individual mounting, replacement and servicing of the individual components, each having multiple independent attachment points, is avoided.

11 Claims, 2 Drawing Sheets

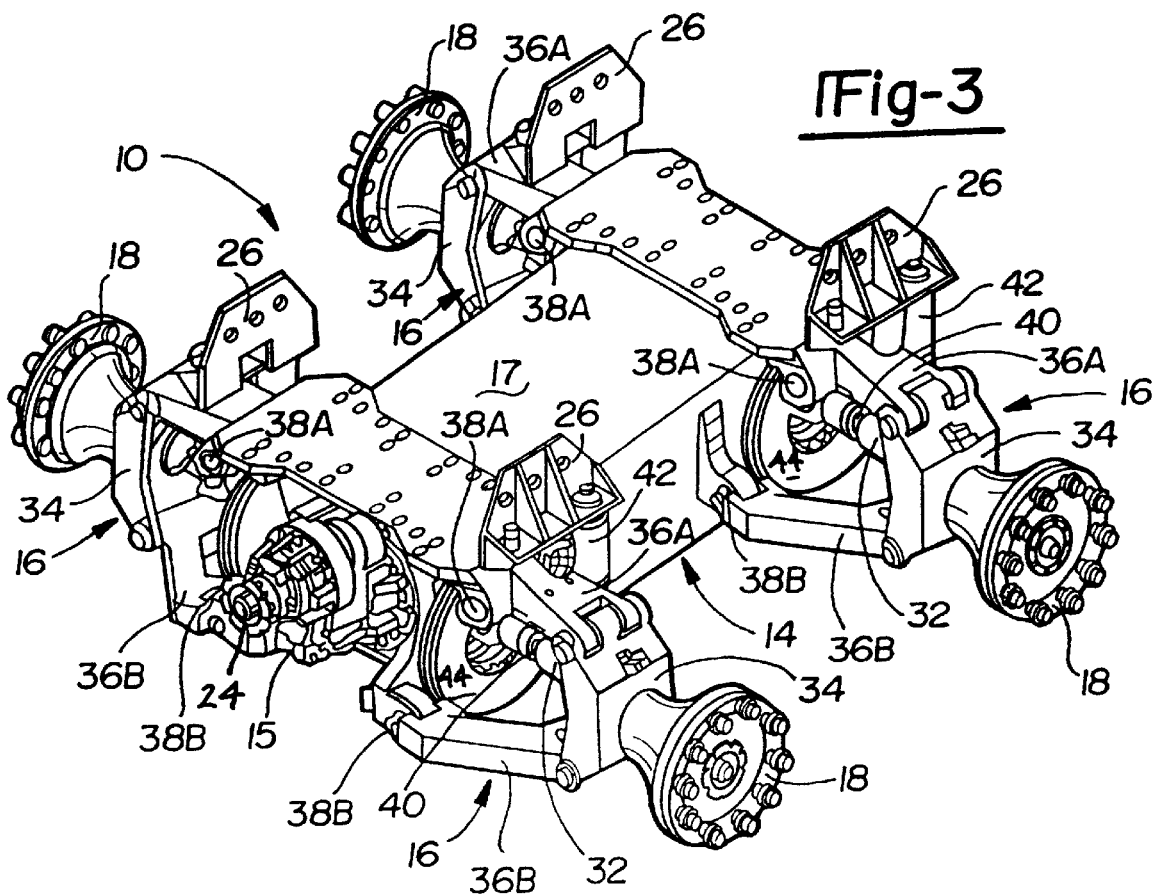

SUBFRAME DRIVELINE MODULE

BACKGROUND OF THE INVENTION

The present invention relates to a module for attachment to a vehicle frame, and more particularly to an integral module that supports an independent suspension and driveline system that is collectively mountable to a vehicle main frame.

A vehicle such as a tractor of a tractor trailer vehicle commonly includes a main frame having a pair of longitudinally extending members which support a load. The members are suspended from the frame, containing components that provide torque and speed multiplication to the wheels as well as other features such as wheel speed differentiation, axle speed differentiation (in the case of tandem or tandem drive units), prevention of wheel speed differentiation, etc. Separate and distinct from these longitudinally extending members is another device mounted typically to the engine which provides selective or automatic speed and torque multiplication to a drive shaft which couples to the longitudinally extending members. The individual driveline components, must therefore be separately assembled and attached to the main frame through the engine, suspended bearing mounts and a suspension attaching the frame and longitudinally extending members.

Unfortunately, the individual assembly and attachment of each component to the main frame is a time consuming and labor intensive process. Further, it is difficult to integrate the systems as the multiple independent attachment points prevent the systems from being installed simultaneously. Additionally, the size of a completed main frame of a tractor requires an excessive amount of space for assembly of each independent component.

SUMMARY OF THE INVENTION

The present invention provides a driveline assembly module that is previously assembled and collectively mounted to a vehicle main frame thereby reducing the number of assembly steps and contributing to an improvement in productivity, quality and serviceability.

The driveline assembly module of the present invention includes a rigid, substantially box-like drivetrain assembly that is the support structure for drivetrain components such as a transmission and differential assembly. An independent suspension system each having an associated wheel hub is operable attached to the drivetrain assembly. Preferably, the independent suspension systems are structurally supported by the drivetrain assembly. By mounting the drivetrain components and associated subsystems together as a module, then mounting the module as a unit to the vehicle, the individual components can be mounted and serviced by replacement of the entire module. Thus, the individual attachment, replacement and servicing of each individual component, each previously having multiple independent attachment points for attachment to the vehicle, is avoided.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 3 is general perspective view of the present invention detached from the vehicle of FIG. 1.

DETAILED DESCRIPTION OF THE PREFERRED EMBODIMENT

Figure 1:
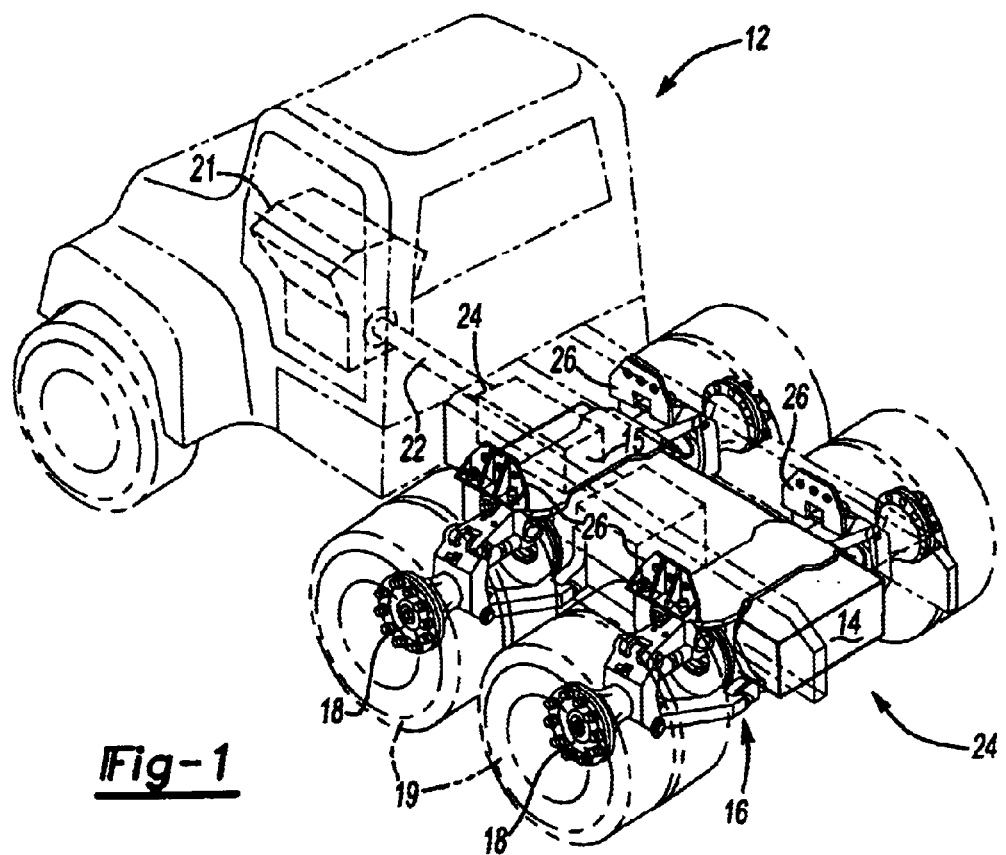
FIG. 1 is a general perspective view of a generic vehicle tractor rig for use with the present invention.
Figure 2:
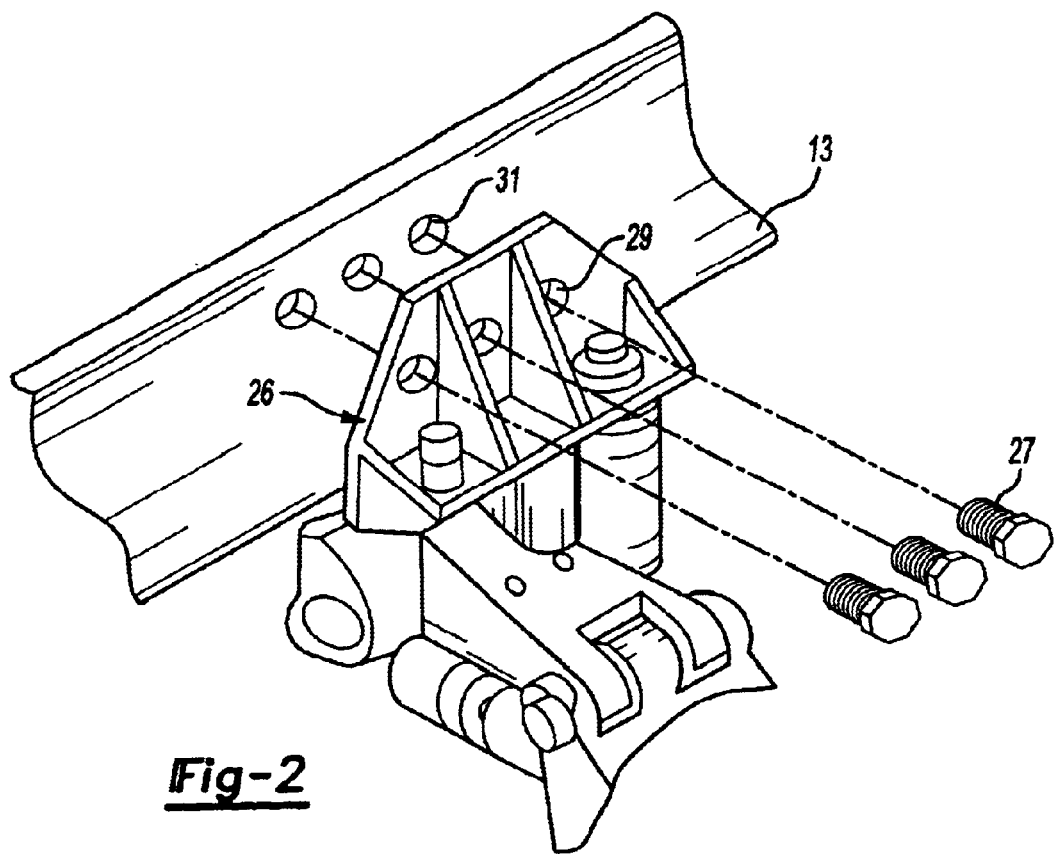
FIG. 2 is general expanded view of a mounting to attach the present invention to the vehicle of FIG. 1.

A driveline assembly module 10 of the present invention is shown schematically in FIG. 1 mated with a generic vehicle. The vehicle 12 is preferably a self-powered vehicle such as a truck tractor. However, it should be realized that many vehicles can benefit from the present invention. As will be further described below the module 10 is an integral unit previously assembled and collectively mounted to the vehicle 12. The module 10 is shown in FIG. 2 as being mounted to a frame assembly 13 of the vehicle 12, however, it will be understood that the module 10 can be mounted to other members and at other locations.

Referring to FIG. 1, the module 10 includes a drivetrain assembly 14 for the vehicle 12. The drivetrain assembly 14 as a structural member that can support driveline components such as a transmission and differential assembly (shown rather schematically at 15) and an independent suspension 16. By providing the drivetrain assembly 14 as a structural member, the module 10 can be independently assembled and later attached to the vehicle 12. Thus, the individual attachment, replacement and serving of each individual drivetrain component, each previously having multiple independent attachment points for attachment to the vehicle, is avoided.

Each independent suspension system 16 includes an associated wheel hub 18 having tires 19 operably connected to the drivetrain components 15. The independent suspension system 16 can be articulately attached to the vehicle 12 or directly to the drivetrain assembly 14. Preferably, each independent suspension 16 is structurally supported by the drivetrain assembly 14 such that the module 10 is an integral unit. The module 10 is preassembled to include all drive line components and sub-systems such that the module can be integrally attached and detached from the vehicle by rolling the module 10 under the vehicle frame 13 and attaching the brackets 26 to the frame 13.

The drivetrain assembly 14 is connected to an engine (shown schematically at 21) through a drive shaft 22 or the like. Preferably, an integral coupling 24 connects the drivetrain assembly 14 to the drive shaft 22. The drivetrain assembly 14 transfers the motive force from the drive shaft 22 to each wheel hub 18. The coupling 24 provides a disconnect to allow the module 10 to be easily attached and detached from the drive shaft 22. Notably, the drivetrain components 15 are attached to the drivetrain assembly 14 and not the vehicle engine 21. Accordingly, by mounting the drivetrain components 15 to the module 10, the components can be mounted, replaced and serviced by replacement of the entire module 10.

As shown in FIG. 2, a mounting such as bracket 26 is preferably used to mount the module 10 to the frame 13. The brackets 26 are attached to the mainframe 13 by fasteners such as bolts 27 or the like which fit within corresponding openings 29 of the brackets 26 to be received within the frame 13 in opening 31. The brackets 26 and fasteners allow the detachable mounting of the module 10 the vehicle 12. Although brackets 26 are disclosed to detachably mount the module 10, it will be understood that other mountings can be used.

The module 10 is further shown in FIG. 3 separated from the vehicle 12. The drivetrain assembly 14 is preferably a rigid, substantially rectilinear structure, that is the main support structure for all the driveline components. Although the drivetrain assembly 14 is shown as a box-like member this is for illustrative purposes only and it should be realized that the drivetrain assembly 14 is not limited to such a configuration.

In the disclosed embodiment, four independent suspension systems 16, are supported by the drivetrain assembly 14. Each independent suspension system 16 provides an associated wheel hub 18 operably connected to the drivetrain components 15. While the number of wheels depicted includes two wheels to each independent suspension system, it will be understood that this is consistent with standard eighteen-wheel tractor construction and that the number of independent suspension systems and the number of wheels per suspension system can vary.

The wheel hub 18 of each independent suspension 16 is driven by an axle 32 coupled to the drivetrain components 15. A mount 34 rotatably supports each hub 18 and axle 32. The mount 34 and hub 18 are independently supported by an upper 36A and lower 36B linkage arm. The linkage am 36A, 36B are preferably pivotally attached to the drivetrain assembly 14 at respective pivots 38A, 38B. An articulatable joint 40 allows the axle 32 to articulate through a range of motion defined by the linkage arms 36A,B.

A damper 42 sub-system such as a shock absorber or air cell, is attached between the lower linkage arm 36B and the bracket 26. Further, other sub-systems such as a brake system (shown somewhat schematically at 44) are provided for each hub 18 and also mounted to the drivetrain assembly 14. The module 10 thereby supports and connects each individual hub 18 wit the driveline components and sub-systems required for a self contained independent suspension.

The present invention has been described in an illustrative manner, and it is to be understood that the terminology which has been used is intended to be in the nature of words of description rather than of limitation. Many modifications and variations of the present invention are possible in light of the above teachings. It is, therefore, to be understood that within the scope of the appended claims the invention may be practiced otherwise than as specifically described.

What is claimed is:

1. A driveline assembly module, comprising:

a substantially rectilinear drivetrain assembly;

a coupling that connects said drivetrain assembly to an engine drive shaft; and four independent suspension systems wholly mounted to said substantially rectilinear drivetrain assembly, each of said independent suspension systems supporting a respective wheel hub, each of said wheel hubs operably attached to said drivetrain assembly to drive said wheel hubs;

whereby said driveline assembly module is detachably mountable to a vehicle frame.

2. The module of claim 1, wherein said rectilinear assembly at least partially contains a differential.

3. The module of claim 1, wherein said engine drive shaft is driven by a remotely located engine to power said drivetrain assembly.

4. The module of claim 1, wherein said drivetrain assembly includes a brake system.

5. The module of claim 1, wherein each of said independent suspension systems is mounted adjacent a respective corner of said rectilinear drivetrain assembly.

6. The module of claim 1, wherein each of said hubs support two wheels to each independent suspension system.

7. A driveline assembly module, comprising:

a substantially rectilinear drivetrain assembly which at least partially contains a differential;

a coupling that connects said drivetrain assembly to an engine drive shaft; and four independent suspension systems wholly mounted to said substantially rectilinear drivetrain assembly, each of said independent suspension systems articulatably attached to said substantially rectilinear drivetrain assembly to support a respective wheel hub, each of said wheel hubs operably attached to said drivetrain assembly to drive said wheel hubs;

whereby said driveline assembly module is detachably mountable to a vehicle frame at a plurality of mounting points.

8. The module of claim 7, wherein said engine drive shaft is driven by a remotely located engine to power said drivetrain assembly.

9. The module of claim 7, wherein each of said independent suspension systems is mounted adjacent a respective corner of said rectilinear drivetrain assembly.

10. The module of claim 7, wherein each of said hubs support two wheels to each independent suspension system.

11. A method of removably attaching a driveline assembly to a vehicle comprising the steps of:

(1) preassembling a substantially rectilinear drivetrain assembly as a module, remote from a vehicle engine, said substantially rectilinear drivetrain assembly wholly supporting four independent suspension systems, each of said independent suspension systems articulatably attached to said substantially rectilinear drivetrain assembly to support a respective wheel hub, each of said wheel hubs operably attached to said drivetrain assembly to drive said wheel hubs; and (2) attaching said module to said vehicle as a complete and removable drivetrain unit.

* * * * *

UNITED STATES PATENT AND TRADEMARK OFFICE
CERTIFICATE OF CORRECTION

PATENT NO. : 6,752,235 B1
DATED : June 22, 2004
INVENTOR(S) : Bell et al.

It is certified that error appears in the above-identified patent and that said Letters Patent is hereby corrected as shown below:

Column 4,
Line 3, please insert -- drivetrain -- after "rectilinear" and before "assembly".

Signed and Sealed this

Third Day of August, 2004

JON W. DUDAS
*Acting Director of the United States Patent and Trademark Office*